Dec. 25, 1956  G. D. PHILLIPS, JR  2,775,135
MIXING VALVE OPERATION
Filed Oct. 23, 1952  2 Sheets-Sheet 1

GERARD D. PHILLIPS JR.
INVENTOR.

BY
Andrew K. Foulds
his ATTORNEY

Dec. 25, 1956

G. D. PHILLIPS, JR 2,775,135

MIXING VALVE OPERATION

Filed Oct. 23, 1952

2 Sheets-Sheet 2

INVENTOR.
GERARD D. PHILLIPS JR.
BY
Andrew K. Foulds
his ATTORNEY

United States Patent Office 2,775,135
Patented Dec. 25, 1956

2,775,135

MIXING VALVE OPERATION

Gerard D. Phillips, Jr., Louisville, Ky., assignor to American Radiator & Standard Sanitary Corporation, Pittsburgh, Pa., a corporation of Delaware Application October 23, 1952, Serial No. 316,527

2 Claims. (Cl. 74—478)

This invention relates to new and useful improvements in mixing valves and more particularly to a novel pedal operated mixing valve.

One of the objects of this invention is to provide a mixing valve of new and improved construction utilizing a novel pedal operator.

Another object is to provide a new and improved pedal operated mixing valve arranged for pedal operation by a single foot.

Another object is to provide a mixing valve having a pair of actuating pedals of new and improved construction which permit valve operation by movement of a single foot substantially in one plane.

Other objects will become apparent from time to time throughout the specification and claims as hereinafter related.

This invention comprises the new and improved construction and combination of parts which will be described hereinafter and the novelty of which will be particularly pointed out and distinctly claimed.

Figures 1, 4:
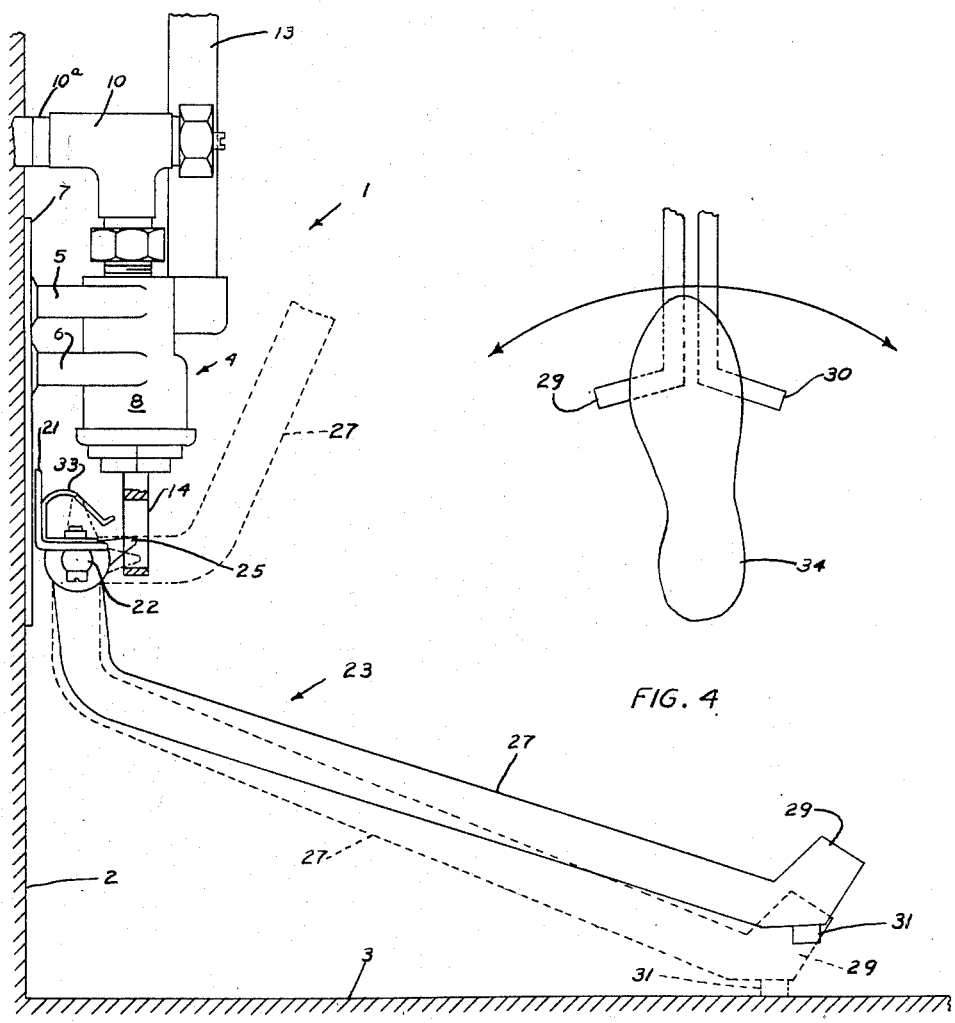
Figure 3:
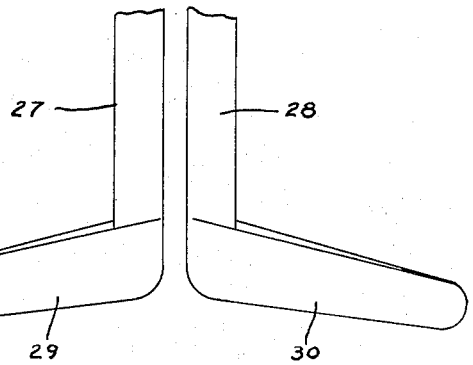
Figure 2:
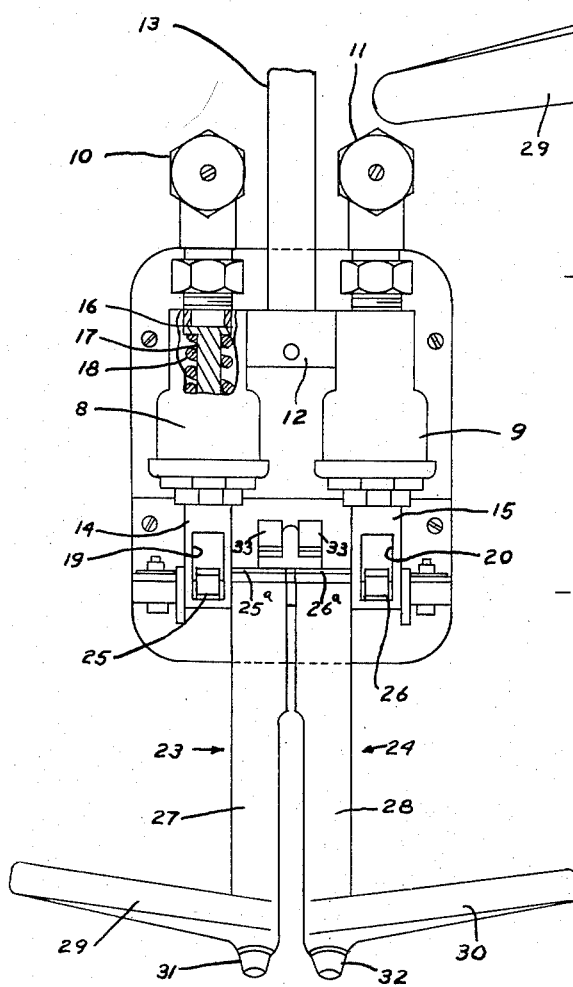
Figure 5:
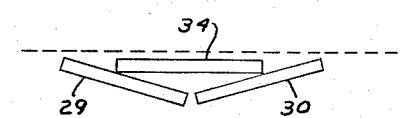
Figure 6:
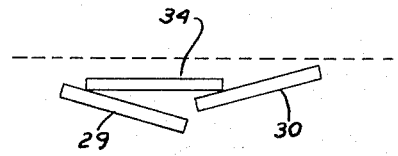

In the accompanying drawings, to be taken as a part of this specification, there is clearly and fully illustrated a preferred embodiment of this invention, in which drawings:

Figure 1 is a view in side elevation of mixing valve disclosing the present invention and showing the relationship of the same to the wall and floor on and adjacent which it is mounted, Fig. 2 is a view in front elevation of the valve shown in Fig. 1, Fig. 3 is a partial plan view of the valve operating pedals shown in Figs. 1 and 2, Fig. 4 is a diagrammatic view showing the operation of the valve actuating pedals by the single foot of an operator, and Figs. 5 and 6 are diagrammatic views of the valve actuating pedals showing the position of the same at two different stages of operation.

Referring to the drawings by characters of reference, there is shown a pedal operated mixing valve 1 of the type which is customarily used in hospitals for controlling the flow of hot and cold water to a wash basin. The valve 1 is shown as being mounted on a vertical wall 2 and adjacent the floor 3. The valve 1 comprises a valve casing 4 having lugs 5 and 6 for connection to a mounting plate 7. The valve casing 4 has two sections 8 and 9 providing passages for flow of hot and cold water. The casing sections 8 and 9 have inlets 10 and 11 connected to inlet pipes 10a and a single outlet 12 connected to a discharge pipe or conduit 13 for discharge of mixed water. The valve casings 8 and 9 have valve stems 14 and 15 reciprocally movable therein. The valve casing 8 is shown in partial section to show the valve seat 16 which is closed by a valve member 17 urged to closed position by a spring 18. The valve construction within the valve casing portion 9 is identical with that just described and, therefore, is not shown. The valve stems 14 and 15, which extend from the lower portion of the valve casings 8 and 9, have slots 19 and 20, respectively, therein. At the lower end of the wall mounting plate 7, there is provided a bracket member 21 which provides a fulcrum 22 for a pair of bell crank lever actuators 23 and 24, respectively. The bell crank lever actuators 23 and 24 have short crank arm portions 25 and 26 and pedal lever portions 27 and 28. The lever actuators also have flange portions 25a and 26a extending substantially parallel to the crank arms. The pedal lever portions 27 and 28 carry at their lower ends a pair of pedal actuators 29 and 30 which are positioned closely side by side for operation by single foot. The pedal actuators 29 and 30 are inclined with respect to each other to form a large dihedral angle, the purpose of which will be set forth more completely in the description of operation of this valve. The pedal actuators 29 and 30 each have stop abutments 31 and 32, respectively, which is engageable with the floor 3 to limit movement of the pedal levers. Adjacent the lever fulcrum 22, there is positioned a U-shaped spring clip 33 which is carried on the bracket 21. There are provided two of these spring clips 33, one cooperable with each of the lever flanges 25a and 26a, respectively. The spring clips 33 are positioned adjacent the crank arms 25 and 26 so that the actuating levers can be moved to position indicated in the upper dotted line view and may be held in that position by engagement of the clips 33 with the flanges 25a and 26a. The spring clips 33 could, if desired, be positioned to engage the crank arms 25 and 26 rather than the lever flanges.

Operation

In considering the operation of this valve, some consideration must be given to the prior art. It should be recognized that numerous attempts have been made in the past to provide a pedal operated valve which is easily manufactured and installed and which is simple to operate. Two such attempts have been shown in Patents 1,627,020 and 1,807,900 to G. O. Dougherty. In these patents, there is shown a mixing valve arrangement which is operated by a pair of pedal actuators which are positioned closely side by side. Other such attempts are shown in Speiden Patent 1,176,784, Dederer 1,366,120, Yeiser 1,460,931, and Zinkil 2,188,258. This last group of patents represents an attempt to solve this problem by providing a single actuator which may be depressed to control volume of water flow and rotated to control relative flow of hot and cold water. In each of these prior art devices, the arrangement permitted operation by the single foot of an operator. However, in these and other prior art devices, the operator's foot would have to both depress the actuating mechanism and rotate the same by a twisting movement of the foot to determine the relative position of the hot and cold water control valves for determining mixed water temperature. In the present valve construction, there is provided a much more efficient pedal actuator in that the pedal actuators are inclined to a dihedral angle which permits relative movement of the valve actuating pedals without requiring a twisting movement on the part of the operator's foot.

In each of the valve casings 8 and 9, there are provided valves for control of hot and cold water, respectively. The valves are spring loaded to a normally closed position. The valve members are reciprocally actuated by engagement of the bell crank lever portions 25 and 26 with the slotted ends 19 and 20 of the valve stems 14 and 15, respectively. The relation of the valve stems and bell crank levers is such that the downward movement of the pedal levers 27 and 28 will cause the crank arm portions 25 and 26 to engage and move the valve stems 14 and 15 toward a valve opened position. From this description of operation, it will be seen that downward movement of the pedal levers 27 and 28 will cause an opening and increased flow through each of the valve casings 8 and 9. It should also be apparent that while the volume of flow can be controlled by the extent of depression of the pedal levers, the temperature of mixed water flowing through the outlet pipe 13 can be controlled by the relative position of the pedal levers 27 and 28. Because of the dihedral angle at which the pedal actuators 29 and 30 are set, the operator's foot will normally rest in this angle and adjustment of the relative position of the levers may therefore be effected by rotary movement of the foot from side to side about the axis defined by the operator's leg. This feature of operation of this valve is brought out more clearly in the diagrammatic views shown in Figs. 4, 5, and 6. In Fig. 4, there is shown a diagrammatic view showing the initial position of an operator's foot and indicating the direction of side to side movement. In such an operation, the heel would rest on the floor free and the front part of the foot 34 would be cradled in the dihedral angle formed by the pedal actuators 29 and 30 as indicated in Fig. 5. If an increased flow of water is desired, the front part of the foot 34 would merely be depressed to move the levers 27 and 28 to open the valves wider. If a greater quantity of hot or cold water is desired, the foot is merely rotated on the heel about the vertical axis of the operator's leg as shown in Fig. 6, which effects a relative displacement of the actuators 29 and 30 to the desired position without requiring a twisting movement of the foot.

From the foregoing description it will be apparent that the angular construction of the pedal actuators permits adjustment of water temperature by adjusting the relative position of the pedal actuators without requiring a twisting movement of the operator's foot. In this construction, the volume of flow may be adjusted by movement of the foot in a vertical direction and the temperature may be adjusted by movement of the foot substantially in a horizontal plane by rotation on the heel and about the vertical axis of the operator's leg.

Although the dihedral angle of the pedal actuators 29 and 30 in this construction have been shown as being formed by the adjacent positioning of two plane pedals, it should be obvious to the artisan that the same result would be reached if the pedal operators were of a curved construction or of any other construction whereby an angular displacement may be effected by movement of the operator's foot from side to side.

Having thus described the invention, what is claimed and is desired to be secured by Letters Patent of the United States is:

1. In a device of the class described, a pair of bell crank levers having crank arms and lever arms, means to be actuated by said bell crank levers, said means having slotted portions engageable with said bell crank arms, said bell crank levers being pivotally mounted adjacent said means and said crank arms being movable into said slotted portions to engage said means for actuation thereof, said lever arms extending downward, pedals on the lower ends of said lever arms and positioned closely side by side for depression by an operator's foot to actuate said means, said pedals being inclined to form a dihedral angle for receiving the operator's foot so that the relatively depressed position of the pedals may be varied by rotary movement of the foot about the axis of the leg and substantially in a single plane, a pair of spring clips positioned one adjacent each of said bell crank arms, and said spring clips being positioned to engage and hold said levers upon predetermined rotation thereof to hold said pedal lever arms in an elevated position.

2. In an actuating device, a pair of bell crank levers having crank arms and lever arms, means to be actuated by said bell crank levers, said means having slotted portions engageable with said bell crank arms, said bell crank levers being pivotally mounted adjacent to said means, said crank arms being movable into said slotted portions to engage said means for actuation thereof, said lever arms extending downward, pedals on the lower ends of said lever arms and positioned closely side by side for simultaneous depression by an operator's foot to actuate said means, said pedals being inclined upwardly to form a dihedral angle for receiving the operator's foot so that the relatively depressed position of said pedals may be varied by rotary movement of the foot about the axis of the leg and substantially in a single plane.

References Cited in the file of this patent

UNITED STATES PATENTS

| 1,050,686 | Pelton | Jan. 14, 1913 |
| 1,080,695 | Howe | Dec. 9, 1913 |
| 1,344,343 | Harp | June 22, 1920 |
| 1,627,020 | Dougherty | May 3, 1927 |
| 1,919,968 | Trabold | July 25, 1933 |
| 2,287,011 | Beabe | June 23, 1942 |
| 2,392,086 | Fisher | Jan. 1, 1946 |

FOREIGN PATENTS

| 22,681 | Great Britain | Oct. 4, 1897 |
| 280,968 | Great Britain | May 3, 1928 |
| 622,878 | France | Mar. 8, 1927 |
| 637,156 | Germany | Oct. 27, 1936 |